United States Patent
Hegel

(10) Patent No.: US 6,671,073 B2
(45) Date of Patent: Dec. 30, 2003

(54) ENVIRONMENTALLY PROTECTED HOLOGRAPHIC DEVICE CONSTRUCTION

(75) Inventor: Ramon F. Hegel, North St. Paul, MN (US)

(73) Assignee: Imation Corp., Oakdale, MN (US)

(*) Notice: Subject to any disclaimer, the term of this patent is extended or adjusted under 35 U.S.C. 154(b) by 60 days.

(21) Appl. No.: 09/829,578

(22) Filed: Apr. 10, 2001

(65) Prior Publication Data

US 2002/0145772 A1 Oct. 10, 2002

(51) Int. Cl.[7] .................................................. G03H 1/02
(52) U.S. Cl. .................................................. 359/3; 430/2
(58) Field of Search .............................. 359/3; 156/99, 156/107; 369/283, 284, 286, 288; 430/1, 2

(56) References Cited

U.S. PATENT DOCUMENTS

| | | | | |
|---|---|---|---|---|
| 5,135,592 A | * | 8/1992 | Melvin | 156/73.1 |
| 5,172,250 A | | 12/1992 | Tsuchiya et al. | 359/1 |
| 6,077,629 A | * | 6/2000 | Parker et al. | 430/1 |
| 6,160,645 A | * | 12/2000 | Chandross et al. | 359/3 |

FOREIGN PATENT DOCUMENTS

| | | |
|---|---|---|
| JP | 61014620 | 1/1986 |
| JP | 62063981 | 3/1987 |

* cited by examiner

Primary Examiner—Mark A. Robinson
Assistant Examiner—Alessandro Amari
(74) Attorney, Agent, or Firm—Eric D. Levinson

(57) ABSTRACT

A holographic optical data storage device according to the present invention includes a photopolymer layer having an upper surface and an oppositely disposed lower surface. The device includes a substantially transparent upper substrate layer having a first inside surface lying adjacent to the upper surface of the photopolymer layer. The device includes a substantially transparent lower substrate layer having a second inside surface lying adjacent to the lower surface of the photopolymer layer. The upper and lower substrates have first and second peripheral edges respectively with an opening formed therebetween. The device further includes a connection member engaged to the upper and lower substrates wherein the connection member seals the opening. A method of fabricating a holographic optical data storage device is also provided.

20 Claims, 3 Drawing Sheets

ENVIRONMENTALLY PROTECTED HOLOGRAPHIC DEVICE CONSTRUCTION

This invention was made with Government support under Agreement No. NMA202-97-9-1050 with the National Imagery and Mapping Agency of the United States Department of Defense. The Government has certain rights in this invention

FIELD OF THE INVENTION

The invention is related to holographic optical device constructions. More specifically, the invention relates to reducing environmental impact to the holographic recording media of the optical device. Even more specifically, the invention relates to sealing the peripheral edges of a pair of substrates in a holographic recording device.

BACKGROUND OF THE INVENTION

As the need for storage of more and more massive amounts of data has continued to increase, the use of holographic optical recording medium and techniques has gained attention. In general, holographic recording techniques for recording information in a recording medium employ generation of interference fringes. The interference fringes are written three-dimensionally inside the recording medium by superposition of information light (e.g., carrying image information) and reference light. The information is recorded in the form of the interference fringes. For the purpose of playing back or reading the information, reference light is applied to the recording medium where it is diffracted by the interference fringes. The image information is reproduced in the form of the diffracted light.

Various photopolymers are being developed to act as the recording layer in these holographic optical recording systems. A drawback of many of these photopolymer recording layers is that the environment negatively affects them. That is, exposure of these photopolymers to air and moisture results in degradation of the photopolymer. More specifically, such degradation comes in the form of reduced dynamic range of the photopolymer and hence reduced storage of data. Environmental exposure, specifically moisture, can also result in swelling of the photopolymer.

It is desired to provide a holographic optical device construction in which the photopolymer layer is protected from the environment.

SUMMARY OF THE INVENTION

A holographic optical data storage device is provided according to the invention. The holographic optical data storage device includes a photopolymer layer having an upper surface and an oppositely disposed lower surface. The device further includes a substantially transparent upper substrate layer having a first inside surface lying adjacent to the upper surface of the photopolymer layer. The device further includes a substantially transparent lower substrate layer having a second inside surface lying adjacent to the lower surface of the photopolymer layer. The upper and lower substrates have first and second peripheral edges respectively with an opening formed therebetween. The device further includes a connection member engaged to the upper and lower substrates wherein the connection member seals the opening, wherein exposure of the photopolymer to the environment is reduced.

A holographic optical data storage device is provided according to the invention. The holographic optical data storage device includes a photopolymer layer having an upper surface and an oppositely disposed lower surface. The device further includes a substantially transparent upper substrate layer having a first inside surface lying adjacent to the upper surface of the photopolymer layer. The device further includes a substantially transparent lower substrate layer having a second inside surface lying adjacent to the lower surface of the photopolymer layer. The upper and lower substrates have first and second peripheral edges respectively. The device further includes means for sealing the first and second edges wherein exposure of the photopolymer to the environment is reduced.

A method of making a holographic optical data storage device is provided according to the invention. The method includes providing a substantially transparent upper substrate having a first inside surface and a first peripheral edge. The method further comprises the step of providing a substantially parallel and transparent lower substrate having a second inside surface and a second peripheral edge, wherein an opening is formed between the first and second edges. The method includes the step of injecting a photopolymer layer between the first inside surface and the second inside surface wherein the photopolymer layer lies adjacent to the first inside surface and the second inside surface. The method further includes curing the photopolymer. The method further includes providing a connection member, wherein the connection member seals the opening.

DETAILED DESCRIPTION OF THE PREFERRED EMBODIMENT

A holographic optical data storage device is a holographic recording layer capable of volumetric three-dimensional optical recording and reading and a structural support for the holographic recording layer.

A holographic optical data storage device according to the invention includes an upper substrate, a lower substrate, a holographic recording layer, and a connection member. The holographic recording layer lies between the upper and lower substrates. The upper and lower substrates have peripheral edges.

A connection member is a member that seals the opening between the peripheral ends of the upper and lower substrates. A connection member may be a member that is separate from the upper and lower substrates or it may be integral with the upper and lower substrates. Three examples of connection members are provided further below with regard to the various embodiments. It should be appreciated however that this invention is not limited to these three exemplary embodiments.

FIGS. 1–5 show two different embodiments of a holographic optical data storage device according to the principles of the invention. It should be understood that although the specific embodiments shown in the FIGS. are circular disks, the invention is not limited to such embodiments. The holographic optical data storage devices of this invention could be any other shape including, but not limited to, blocks having shapes such as rectangular, square, triangular, and even other odd shapes.

Figure 1:
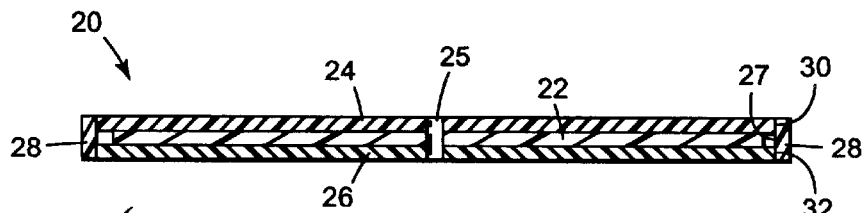
FIG. 1 is a side view of a first embodiment device construction according to the principles of the invention.

In FIG. 1, a holographic optical data storage device in accordance with the present invention is generally shown at 20. The holographic optical data storage device 20 includes a holographic recording layer 22 sandwiched between an upper substrate layer 24 and a lower substrate layer 26. A connection member, specifically circular shaped ring 28 is coupled to the first edge 30 of the upper substrate layer and the second edge 32 of the lower substrate layer 26.

Figure 2:
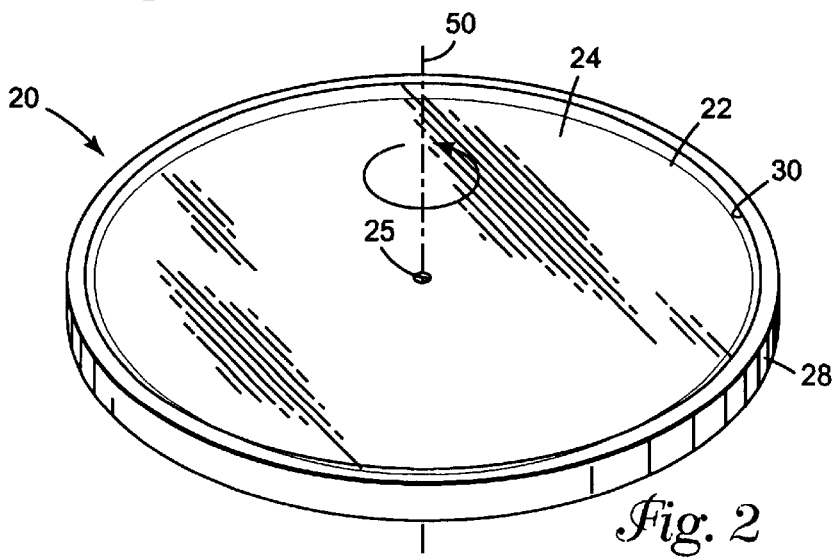
FIG. 2 is a perspective view of a first embodiment device construction according to the principles of the invention.

In FIG. 2, the holographic optical data storage device 20 is shown in a perspective view. The embodiment shown in FIGS. 1 and 2 is referred to as the ring sealed edge device embodiment.

The holographic recording layer 22 is any photopolymer layer. For purposes of this application, a photopolymer layer is any polymer material capable of being written to and read from with an optical holographic recording technique wherein three-dimensional volumetric storage of data is achieved in the material. Various chemistries form photopolymer layers. In one example, the photopolymer layer is an epoxy matrix with a bromostyrene monomer. However, the invention is not limited to this specific photopolymer. Any photopolymer that is adversely affected by the environment would benefit from and be included within the scope of this invention.

It has been found that substrate layers positioned on both sides of the photopolymer layer provide structural support for the photopolymer layer as well as at least partial environmental protection. A substrate layer is a generally flat member that covers at least a portion of the surface of the adjacent photopolymer, and preferably the entire surface, and that structurally supports the photopolymer. For purposes of the invention, the substrate layers may be made of a thermoplastic material. Some example materials are amorphous polyolefin, polycarbonate and acrylic. In one embodiment, two types of acrylic, sheet cast and extruded, were considered. Both of these were found to be adequate. However, other plastics having sufficient strength to structurally support the photopolymer layer and that are substantially transparent may also be used.

In one embodiment, the opposing substrates (24, 26) are substantially parallel to one another and cover the entire recordable surface of the photopolymer layer 22.

Exposure of the photopolymer layer to the environment, including either moisture and/or air causes degradation in the photopolymer layer. Such degradation can come in the form of reduced dynamic range. Furthermore, in the case of a holographic device construction with two substrates, exposure of the photopolymer layer to moisture between the edges of the two substrates causes swelling of the photopolymer layer which moves the two substrates out of parallel positioning. Since parallel positioning is required for proper recording, such swelling potentially destroys the usefulness of the device.

A connection member may be a border member which is a member that is shaped to fit around the peripheral edges of the upper and lower substrates. A border member has an inside surface for sealingly contacting the peripheral edges of the upper and lower substrates. A border member can be any shape such that the inside surface of the border member is shaped to substantially match the shape of the peripheral edges of the upper and lower substrates. A border member may be made of any material that is capable of being welded or otherwise attached to the edges of the opposing substrates.

One embodiment of a border member is a circular shaped ring. A circular shaped ring 28 has been designed to further seal the photopolymer layer from the environment. A ring is an annular member having an inside surface shaped to make sealing engagement with the circular edges of two opposing substrates (24, 26). In one embodiment, the ring is made of plastic material. The ring 28 may be made out of the same materials as the substrate layers. It may be desirable to laser cut the ring 28 from the particular substrates to be used in a particular device construction so that the inside surface of the ring and the edges of the substrate layers match up perfectly for a tight seal.

Many different methods may be used for coupling the ring 28 to the edges (30, 32) of the substrate layers (24, 26). Some of the possible coupling techniques include, but are not limited to, solvent or ultrasonic welding, and sealing with ultraviolet curable resins or moisture resistant silicone glue. The coupling method chosen will depend on the materials used for the ring 28 and the substrate layers (24, 26).

In one embodiment, substrate layers 24 and 26, as well as ring 28, are made of acrylic. For example, Clarex® brand cast acrylic manufactured by Nitto Jushi Kogyo Co. LTD may be used. In this embodiment, a solvent weld such as with chloroform is used to affix or couple the inside surface 27 of the ring 28 to the edges 30 and 32 of the substrate layers 24 and 26, respectively.

In another embodiment, a moisture resistant glue such as a silicone sealant is placed on the edges 30 and 32 of the substrate layers and then the ring 28 is positioned around the substrate layers as shown in FIG. 2. For example, Master-Sil™ silicone sealants from MasterBond Inc. may be used.

In another embodiment, an ultraviolet curable photopolymer can be used to seal the ring 28 to the edges 30 and 32 of the substrates. Such a method requires that the photopolymer layer 22 be masked off during exposure to the ultraviolet light to prevent the unwanted exposure of the photopolymer layer to the ultraviolet light.

In another embodiment, amorphous polyolefin (APO) may be used for the substrates. Since it is more difficult to adhere to polyolefins in general, a primer may be applied to the edges of the APO substrates prior to welding or sealing the substrates to the ring. The same sealing methods as described above could be used. In one example, an acrylic ring could be used with APO substrates.

In one embodiment, the upper substrate 24, photopolymer layer 22 and lower substrate 26 define a hole 25 that is centered in the middle of the disk. The hole 25 may have multiple purposes. First, the hole 25 may be used for injecting the photopolymer 22 into the space between opposing substrates (24, 26). Secondly, the hole 25 may receive a hub for spinning the disk 20 around axis 50 (best seen in FIG. 2). It will also be appreciated to one skilled in the art that sealing photopolymer layer 22 from the environment about the intersection of the hub and the substrates (24, 26) is also desirable within the spirit and scope of the present invention.

Figure 5:
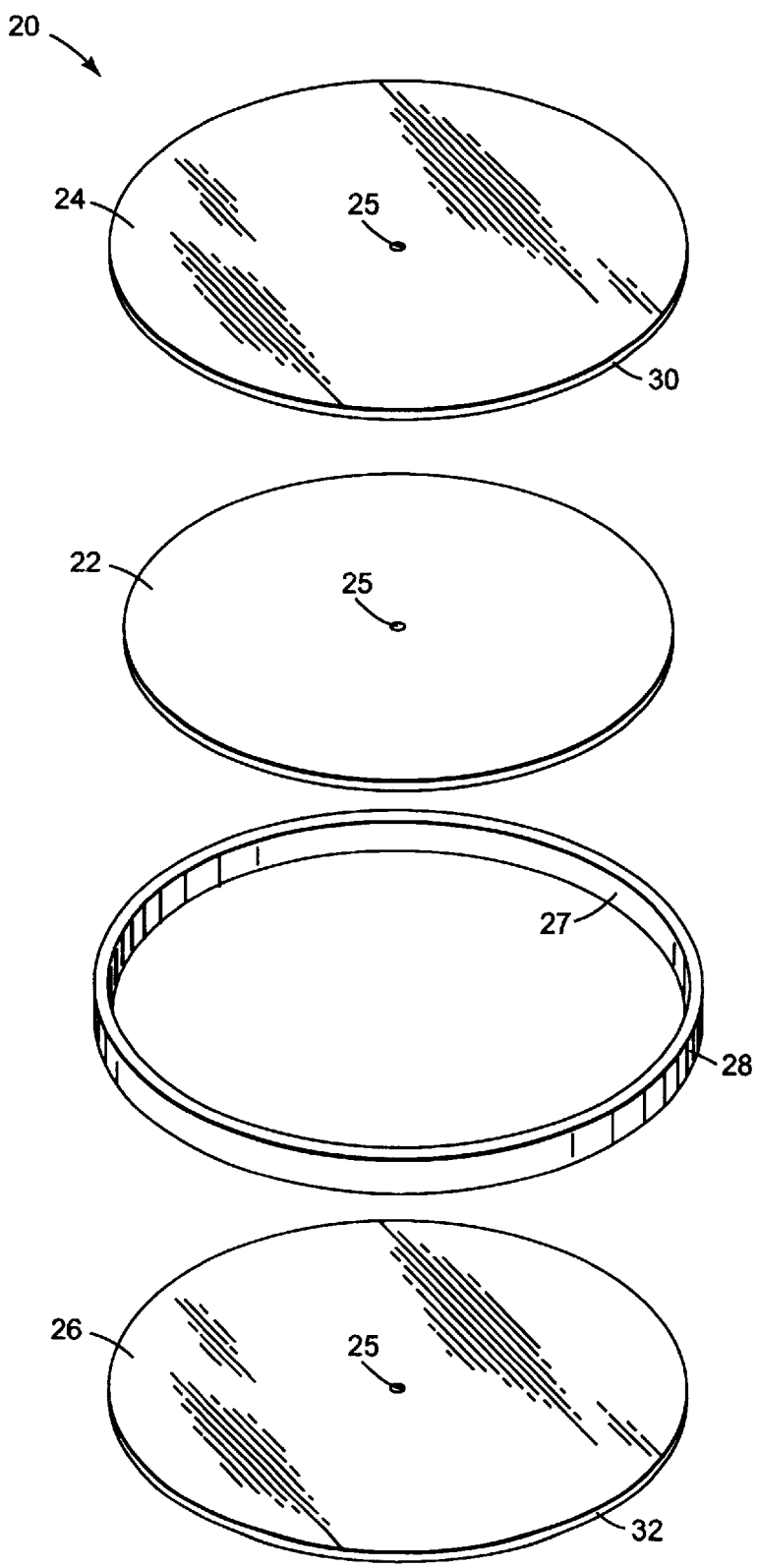
FIG. 5 is an exploded perspective view of a first embodiment device construction according to the principles of the invention.
Figure 6:
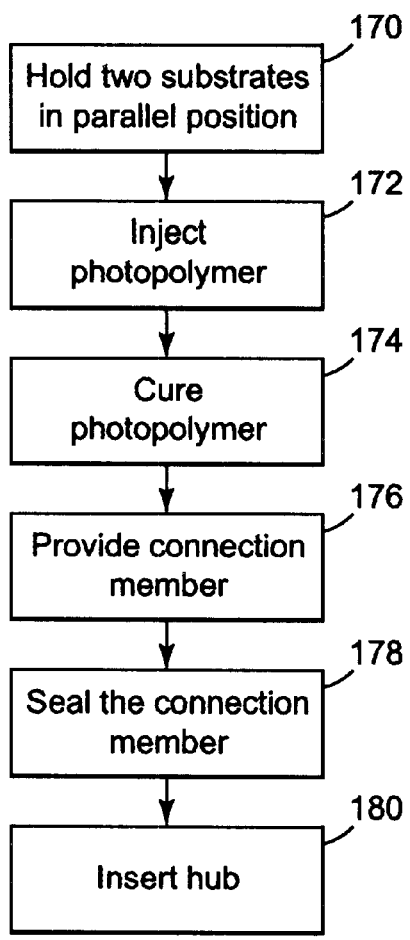
FIG. 6 is a flow chart of a method according to the principles of the invention.

One process for fabricating a holographic device construction will now be described in conjunction with the ring sealed edge disk embodiment illustrated in FIGS. 1, 2 and 5. The process is illustrated in FIG. 6.

First, conventional vacuum flats having a greater diameter than the substrates (24, 26) are used to hold substrates (24, 26) in parallel position with a desired gap between them. This step is illustrated at 170 in FIG. 6. The desired gap between the substrates is determined by the desired thickness of the photopolymer layer that will be injected into that gap.

Next, shown at 172, the photopolymer layer is injected into the gap between the two substrates 24 and 26 through the hole 25 defined in the upper substrate 24. As will be appreciated by one of skill in the art, there are many different ways of injecting the photopolymer into the gap between the two substrates (24, 26). In one embodiment, a hypodermic needle is used on the end of the mixing tube to introduce the photopolymer to an injection barrel attached to the top substrate to achieve a leak free seal during injection.

Next, shown at 174, the photopolymer layer is cured. It is desired that the photopolymer layer be cured prior to sealing the ring 28 in place. One of skill in the art will recognize that many different types of curing processes may be utilized within the scope of the invention. In one embodiment, a room temperature cure is used. It is also possible to utilize a reaction injection molding type curing process to get faster cycle times.

Next, shown at 176, a connection member is provided.

Next, shown at 178, the connection member is sealed into place adjacent the edges of the substrates. In the ring embodiment, ring 28 is sealed into place such that inside surface 27 is sealed with edges 30 and 32. One way to perform this step is to place a solvent or silicone sealant or other sealing material or glue onto the edges 30 and 32, or the inside surface 27, or both, and then place the ring 28 into position around the two substrates 24 and 26 as shown in FIGS. 1 and 2.

Next, shown at 180, a hub is inserted into the center hole 25. One skilled in the art will appreciate that the hub can be sealed in place in the hole 25 according to the principles of this invention.

Figure 3:
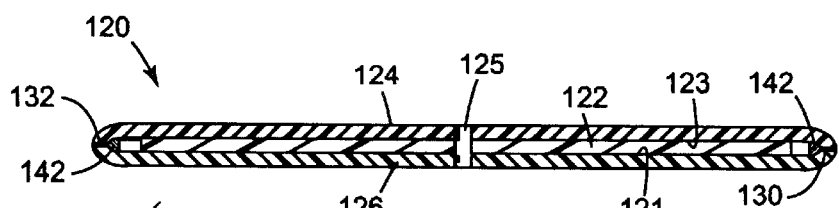
FIG. 3 is a side view of a second embodiment device construction according to the principles of the invention.
Figure 4:
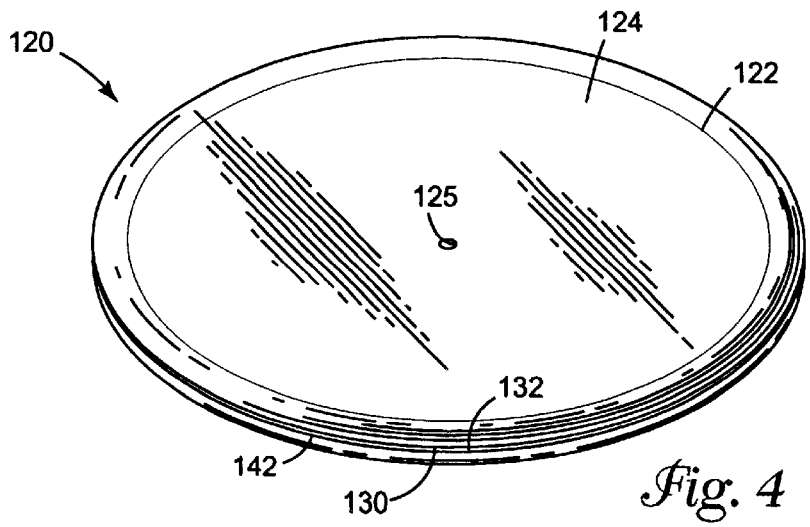
FIG. 4 is a perspective view of a second embodiment device construction according to the principles of the invention.

Another embodiment holographic optical data storage device construction, referred to as the molded edge seal device embodiment, is shown in FIGS. 3 and 4. The holographic optical data storage device 120 includes a holographic recording layer 122 sandwiched between an upper substrate layer 124 and a lower substrate layer 126.

The holographic recording layer 122 is a photopolymer as defined above with respect to the earlier described embodiment holographic optical data storage device 20.

The upper substrate 124 and the lower substrate 126 are made of the same materials as defined above with respect to the earlier described embodiment holographic optical data storage device 20. In addition to being capable of structurally supporting the photopolymer layer 122, the substrates 124 and 126 must be made of a moldable material so that they can be formed with lips in the edges as is described further below.

The upper substrate 124 defines an inside edge 123 that faces the photopolymer layer 122. The lower substrate 126 defines an inside edge 121 that faces the photopolymer layer 122.

The upper substrate 124 and lower substrate 126 include edges 130 and 132 respectively. The edge 130 includes a first lip in the direction of the photopolymer layer 122, such that at least a portion of the edge 130 is positioned below the first inside surface 123 of the upper substrate 124. The edge 132 includes a second lip in the direction of the photopolymer layer 122, such that at least a portion of the edge 132 is above the inside surface 121 of the lower substrate. A lip can be anything that meets the above definition. The definition of a lip is not limited to the particular embodiment of a lip shown in FIGS. 3 and 4. For example, the lip could be bent at a right angle instead of gradually curved as shown in FIGS. 3 and 4. Many other embodiments of a lip are conceivable and within the scope of this invention.

The first and second lips discussed in the previous paragraph are further examples of a "connection member". In this embodiment, the connection member is integral with the substrates. The connection member in this embodiment, comprises the non-planar part of the substrates.

It should be noted that the terms such as "above" and "below" are used in this specification and claims in reference to an orientation in which the upper substrate is positioned above the lower substrate. However, this invention is not to be limited to this orientation. It is certainly within the scope of this invention for the holographic optical device constructions of the invention to be constructed and/or used in a position different from that shown in the figures.

The molded edge seal method requires a specially designed molding tool for molding the substrates 124 and 126. Such a design requires a lip with a dimension that is determined by the desired thickness of the holographic recording layer 122 and its shrinkage predetermined so that the two edges 124 and 126 make contact or are close to making contact after final cure of the holographic recording layer.

The lips 130 and 132 of the substrates result in a very small gap between the two edges once the photopolymer layer 122 is injected between the upper substrate 124 and the lower substrate 126 and allowed to cure. The edges 130 and 132 are sealingly coupled to each other. Coupling the edge 130 to the edge 132 means that the edges 130 and 132 are sealed together such that air and moisture are prevented from passing through the gap 140 in any substantial way. Insubstantial leakage of air or moisture on the order of the amount of leakage that will pass through the plastic substrate itself is allowed within the scope of this invention. Example coupling of the edge 130 to edge 132 includes using a solvent weld with chloroform, or using moisture resistant glue such as silicone marine glue. The solvent or glue may be drawn into the gap 140 by capillary forces. Glue 142 is shown in FIGS. 3 and 4.

A hole 125 is defined in the upper substrate 124, photopolymer layer 122 and lower substrate 126 for injection of the photopolymer layer 122 between the upper substrate 124 and the lower substrate 126. The hole 125 may also be used for mounting and rotating the device during the read write steps as was described with respect to the ring sealed embodiment.

Another process for fabricating a holographic device construction will now be described in conjunction with the molded edge seal disk embodiment illustrated in FIGS. 3 and 4.

First, the upper substrate 124 and the lower substrate 126 must be constructed. In one embodiment process, the upper substrate 124 and lower substrate 126 are injection molded with the desired shape.

Next, conventional vacuum flats are used to hold substrates 124 and 126 in parallel position with a desired gap between them. This desired gap is determined by the desired thickness of the photopolymer layer that will be injected into that gap.

Next, the photopolymer layer is injected into the gap between the two substrates 124 and 126 through the hole 125 defined in the upper substrate 124.

Next, the photopolymer layer is cured. It is desired that the photopolymer layer be cured prior to coupling or sealing the edges 130 and 132 to each other.

Next, the edges 130 and 132 are coupled to each other. As described earlier, coupling of edge 130 to edge 132 means that the edges 130 and 132 are sealed together such that air and moisture are prevented from passing through the gap between the edges 130 and 132 in any substantial way. Possible example means of coupling edge 130 to edge 132 are solvent weld and moisture resistant glue. In either case, the solvent or glue is drawn into the gap between edges (130, 132) by capillary forces. The glue may or may not fill the space between the photopolymer layer 122 and the edges (130, 132).

It is noted that in FIGS. 1–5, the photopolymer layers 22, 122 do not extend out radially as far as the edges 30, 130 and 32, 132 of the substrates. The invention is not restricted to such an embodiment. Rather, the photopolymer layer 22, 122 may extend radially as far as the edges 30, 130 and 32, 132 of the substrates.

Figure 7:
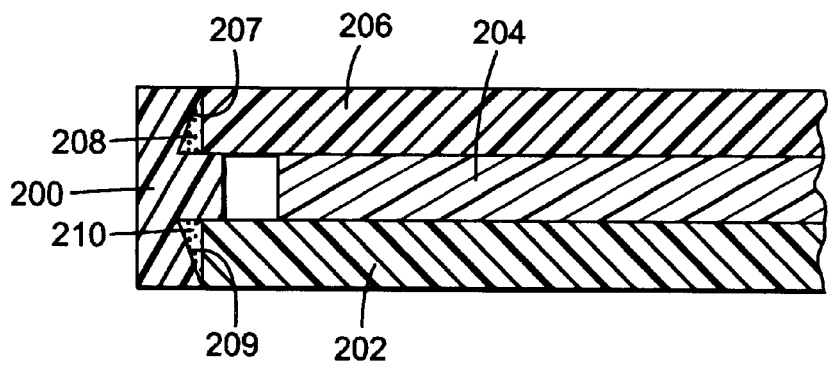
FIG. 7 is a side view of a third embodiment connection member according to the principles of the invention.

An alternative embodiment border member is shown in FIG. 7. Specifically, ring 200 includes a center protrusion for insertion into the space between the substrates 202 and 206. Layer 204 is a photopolymer layer. Angled surfaces 207 and 209 provide a snap fit of the substrates (202, 206) into their permanent position as shown in FIG. 7. A sealant (208, 210) may be placed between the angled surfaces (207, 209) and the peripheral edges of the respective substrates 202 and 206.

A data storage servo tracking pattern may be placed somewhere on the device constructions 20 and 120 where it can be utilized to determine where the data is stored on the device. In one example, the tracking pattern could be etched directly into one of the upper substrates 24 and 124 or alternatively in the lower substrates 26 or 126. Alternatively, a data storage pattern may be replicated on the surface of one of the substrates 24, 124, 26, 126 by adding a photopolymer layer on the outer surface of the substrate.

One advantage of using a thermoplastic material for the substrates is that it can be injection molded and the tracking servo patterns can be molded into the surface of the substrate. The invention is not limited to a particular physical dimension. One exemplary dimension of a device according to the invention is a 130 mm diameter device construction. An antireflective coating (AR coating) may be deposited on one of the surfaces of a substrate of a device construction to prevent distortion of optical beams as they pass through the substrate.

I claim:

1. A method of making a holographic optical data storage device comprising:
    providing a substantially transparent upper substrate having a first inside surface, a first peripheral edge and a hole formed through the upper substrate, and providing a substantially parallel and transparent lower substrate having a second inside surface and a second peripheral edge, wherein an opening is formed between the first and second edges of the upper and lower substrates;
    injecting a photopolymer layer through the hole in the upper substrate and between the first inside surface and the second inside surface, wherein the photopolymer layer lies adjacent the first inside surface and the second inside surface;
    curing the photopolymer and
    providing a connection member, wherein the connection member seals the opening, wherein the exposure of the photopolymer layer to the environment is reduced.

2. The method of claim 1 wherein the connection member comprises a separate border member having a sealing surface for lying adjacent to the first and second edges of the upper and lower substrates.

3. The method of claim 2 wherein the separate border member comprises a circular ring.

4. The method of claim 2 wherein sealing the separate border member to the first and second edges of the upper and lower substrates comprises solvent welding the border member to the first and second edges.

5. The method of claim 2 wherein sealing the separate border member to the first and second edges of the upper and lower substrates comprises gluing the border member to the first and second edges.

6. The method of claim 2, further comprising forming the substrates out of thermoplastic materials by injection molding.

7. The method of claim 1 wherein the connection member includes a first lip of the upper substrate that extends from the upper substrate such that at least a portion of the first edge is positioned below the first inside surface, and a second lip of the lower substrate that extends from the lower substrate such that at least a portion of the second edge is positioned above the second inside surface, wherein the first edge is sealingly coupled to the second edge.

8. The method of claim 1, further comprising sealing the hole following injection of the photopolymer layer through the hole.

9. A method of making a holographic optical data storage device comprising:
    injecting a photopolymer layer between a first inside surface of an upper substrate and a second inside surface of a lower substrate, the upper substrate being formed with a first lip about an outer edge of the upper substrate that extends past the first inside surface toward the lower substrate, and the lower substrate being Loaned with a second lip about an outer edge of the lower substrate that extends past the second inside surface toward the upper substrate;
    curing the photopolymer; and
    sealing a gap between the first lip and the second lip.

10. The method of claim 9, further comprising injecting the photopolymer layer through a hole formed in the upper substrate.

11. The method of claim 10, further comprising sealing the hole following injection of the photopolymer layer through the hole.

12. The method of claim 11, wherein sealing the hole includes attaching a hub to the upper substrate at the hole.

13. The method of claim 9, further comprising forming the substrates out of thermoplastic materials by injection molding.

14. A method of making a holographic optical data storage device comprising:
    injecting a photopolymer layer into an opening between an upper substrate and a lower substrate through a hole formed in the upper substrate;
    curing the photopolymer; and
    sealing the opening at outer edges of the upper and lower substrate to environmentally protect the photopolymer.

15. The method of claim 14, further comprising sealing the hole following injection of the photopolymer layer through the bole.

16. The method of claim 14, wherein sealing the hole includes attaching a hub to the upper substrate at the hole.

17. The method of claim 14, further comprising forming the substrates out of thermoplastic materials by injection molding.

18. The method of claim 14, wherein sealing to opening includes attaching a ring about the outer edges of the upper and lower substrates.

19. The method of claim 14, wherein sealing to opening includes solvent welding a border member to the outer edges of the upper and lower substrates.

20. The method of wherein sealing the opening includes gluing a border member to the outer edges of the upper and lower substrates.

* * * * *

UNITED STATES PATENT AND TRADEMARK OFFICE
CERTIFICATE OF CORRECTION

PATENT NO.    : 6,671,073 B2
DATED         : December 30, 2003
INVENTOR(S)   : Ramon F. Hegel It is certified that error appears in the above-identified patent and that said Letters Patent is hereby corrected as shown below:

Column 8,
Line 27, "being Loaned" should read -- being formed --.
Lines 57 and 60, "sealing to" should read -- sealing the --.
Line 63, "method of wherein" should read -- method of claim 14, wherein --.

Signed and Sealed this

Twenty-seventh Day of July, 2004

JON W. DUDAS
*Acting Director of the United States Patent and Trademark Office*